June 9, 1925.
C. SLUSSER
1,540,811
AUTOMATIC REGULATOR FOR FURNACES
Filed Oct. 28, 1922
4 Sheets-Sheet 1
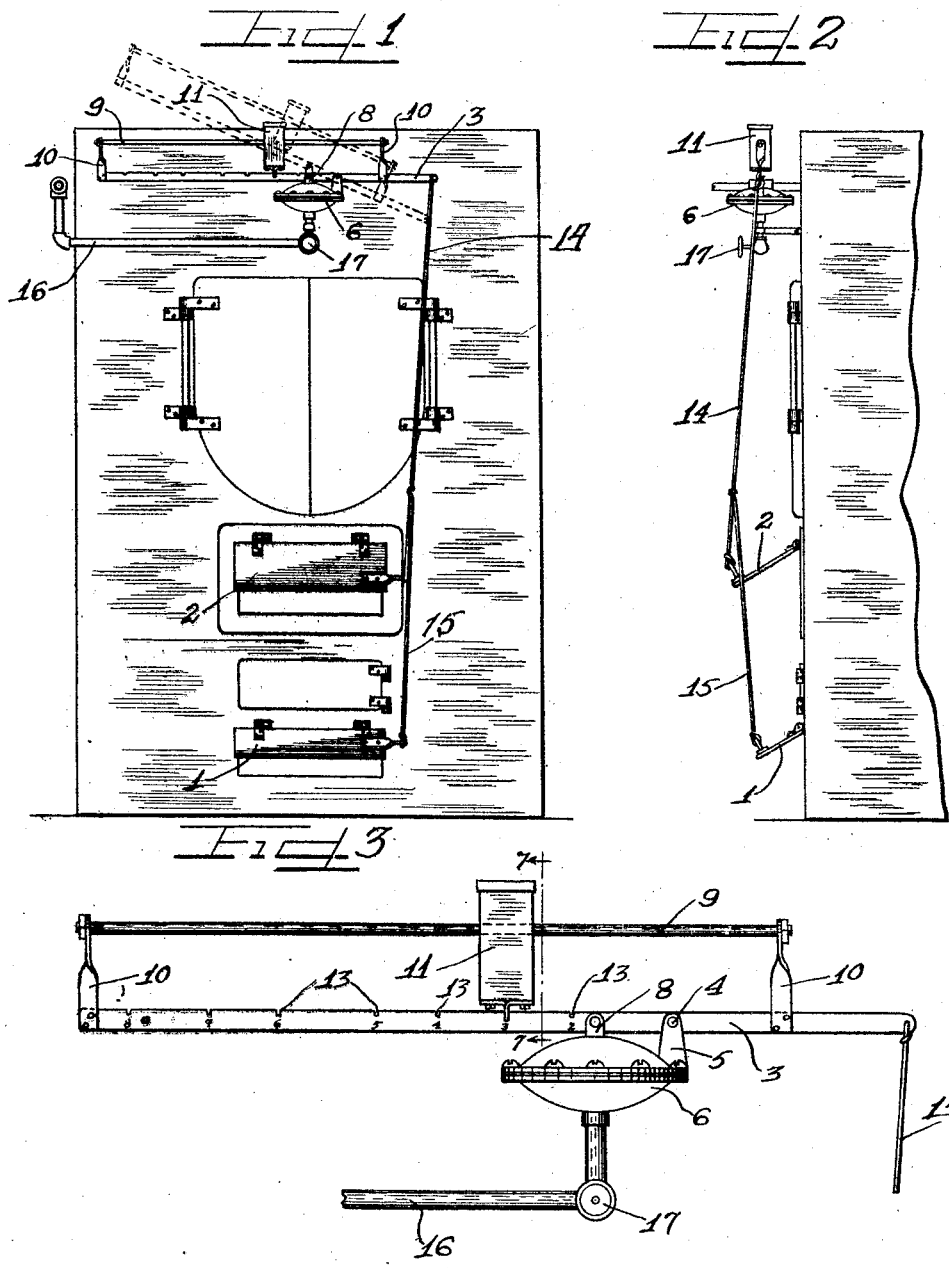

June 9, 1925. 1,540,811
C. SLUSSER
AUTOMATIC REGULATOR FOR FURNACES
Filed Oct. 28, 1922 4 Sheets-Sheet 2
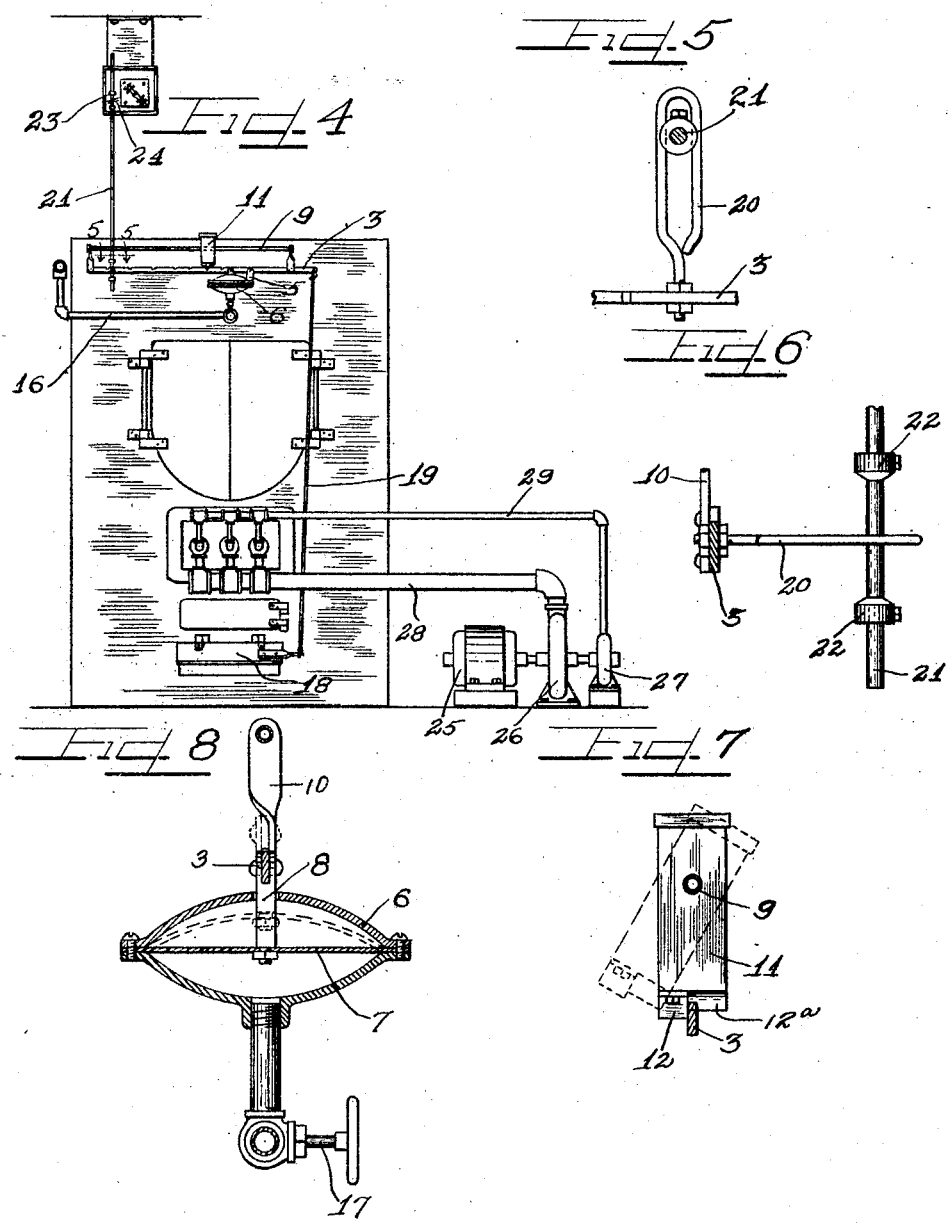

June 9, 1925.
C. SLUSSER
1,540,811
AUTOMATIC REGULATOR FOR FURNACES
Filed Oct. 28, 1922
4 Sheets—Sheet 3
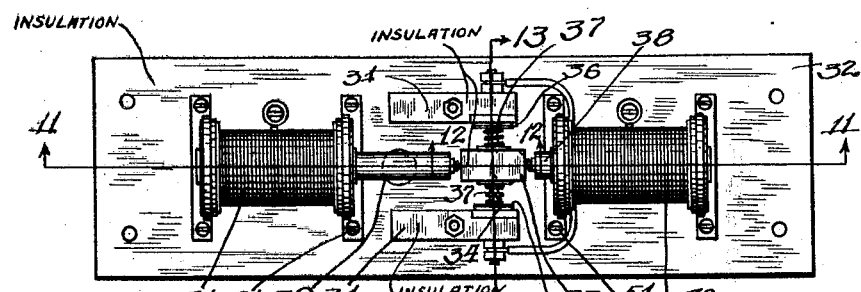
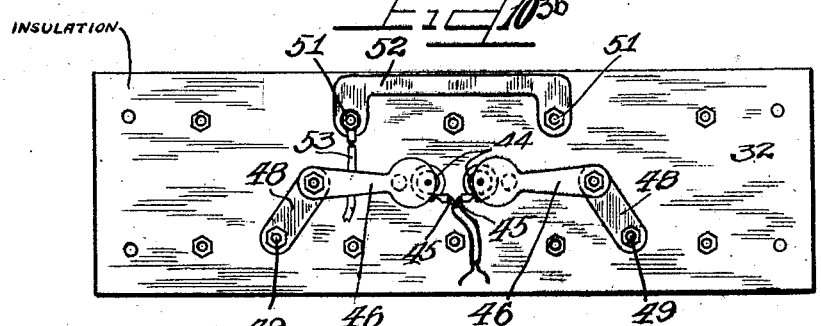
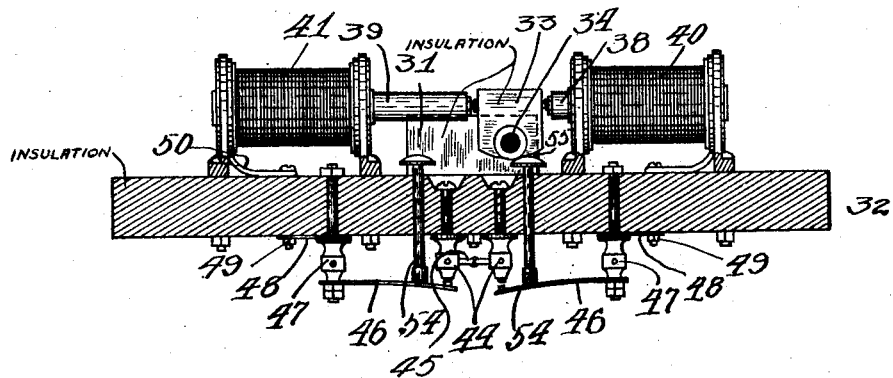

June 9, 1925. 1,540,811
C. SLUSSER
AUTOMATIC REGULATOR FOR FURNACES
Filed Oct. 28, 1922   4 Sheets-Sheet 4
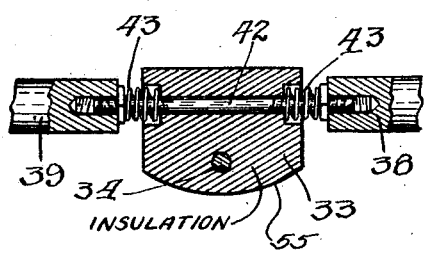
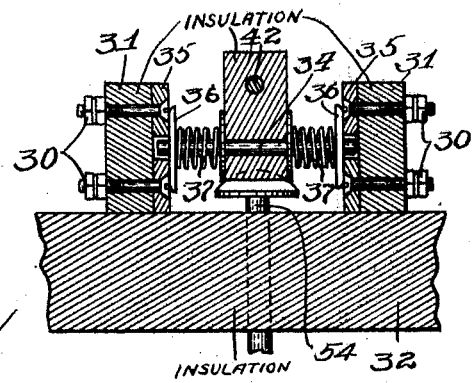
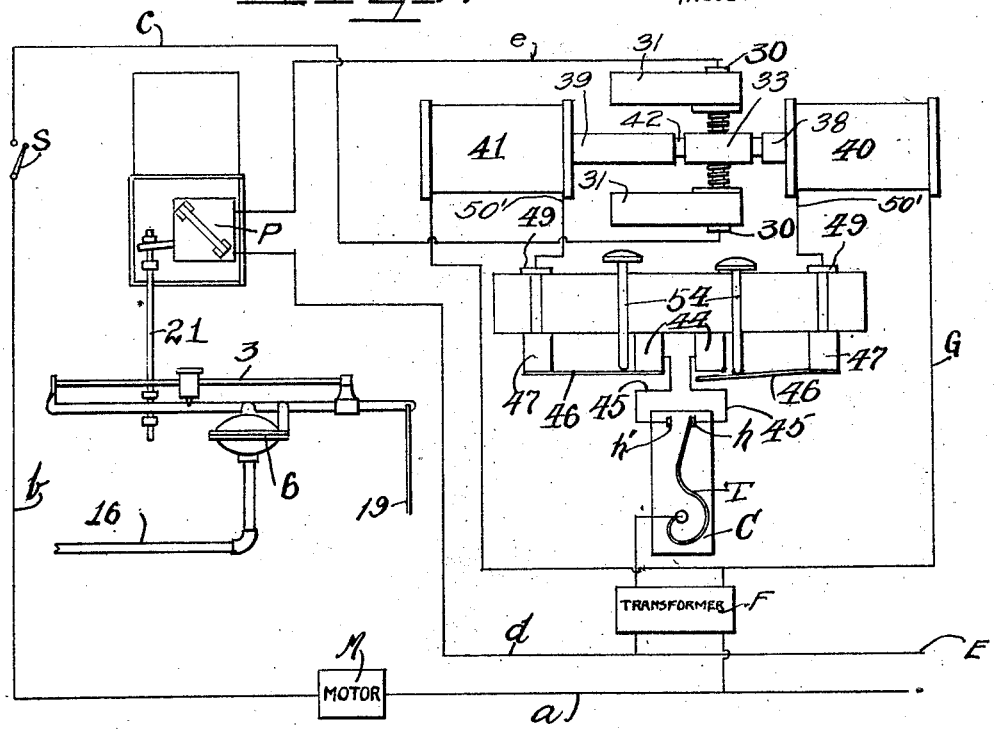

Patented June 9, 1925.

1,540,811

UNITED STATES PATENT OFFICE.

CLYDE SLUSSER, OF CHICAGO, ILLINOIS.

AUTOMATIC REGULATOR FOR FURNACES.

Application filed October 28, 1922. Serial No. 597,450.

*To all whom it may concern:*

Be it known that I, CLYDE SLUSSER, a citizen of the United States, and a resident of the city of Chicago, in the county of Cook and State of Illinois, have invented certain new and useful Improvements in an Automatic Regulator for Furnaces; and I do hereby declare that the following is a full, clear, and exact description of the same, reference being had to the accompanying drawings, and to the numerals of reference marked thereon, which form a part of this specification.

This invention relates to an automatic regulator for furnaces whereby it is possible to maintain substantially uniform heat for a dwelling.

It is an object of this invention to provide a simple regulator that can be readily set by any one and that is sensitively responsive to differences in pressure of the steam.

It is a further object of this invention to provide an automatic regulator that can be readily applied to either a coal or oil furnace.

It is a further object of this invention to provide means for automatically controlling the heat emanating from the furnace according to the temperature of the dwelling.

It is also an object of this invention to provide a thermostat responsive to the heat of the dwelling for regulating the action of the furnace.

With these and other objects in view, which will become more apparent in the following description and disclosures, this invention comprises the novel mechanisms and combinations hereinafter described and more particularly pointed out and defined in the appended claims.

In the accompanying drawings, which illustrate certain preferred embodiments of this invention, and in which similar reference numerals refer to similar features in the different views:

Figure 1 is a front elevational view of a coal furnace with my regulator applied thereto.

Figure 2 is a fragmentary side elevation thereof.

Figure 3 is a front elevational view of my improved regulator upon an enlarged scale.

Figure 4 is a front elevation of an oil furnace with my regulator applied thereto.

Figure 5 is a section on the line 5—5 of Figure 4.

Figure 6 is a fragmentary view partly in section and partly in elevation of the switch control of the motor.

Figure 7 is a section on the line 7—7 of Figure 3 showing the balance weight in elevation.

Figure 8 is a section through the diaphragm valve.

Figure 9 is a top plan view of a thermostatically controlled switch.

Figure 10 is a bottom plan view of the same.

Figure 11 is a section on the line 11—11 of Figure 9.

Figure 12 is an enlarged section upon the line 12—12 of Figure 9.

Figure 13 is an enlarged section upon the line 13—13 of Figure 9.

Figure 14 is a diagrammatic view of the automatic controlling system, shown in Figures 9 to 13.

As shown on the drawings:

In referring now to the drawings, especially to Figures 1 to 3, it will be observed that there is illustrated a furnace provided with a draft door 1 and a fuel door 2. These doors are adapted to be regulated by my automatic regulator to increase or decrease the combustion of the fuel.

My automatic regulator comprises a scale beam 3 fulcrumed upon a stationary pivot 4 supported by a bracket 5 attached to the casing 6 of a diaphragm valve 7 Figure 8 supported within and between the sections of the casing 6, as is well known in the art. The diaphragm valve 7 has attached thereto a vertical rod 8 which extends through the casing and is pivoted at its upper end to the scale beam 3. A rod 9 is supported on the scale beam 3 by means of the brackets 10 and a balance weight 11 is tiltably and slidably mounted on said rod 9. In referring to Figure 7, it will be noted that the balance weight 11 is provided with a stop 12 at one side of the bottom, the remainder of the bottom being in the form of a fin 12$^a$ adapted for engagement with the notches 13 defining the units of measurement on the scale beam which preferably designate pounds.

The forward end of the scale beam 3 is connected with the doors 1 and 2 by means of a wire rod 14 secured to the door 2 and a wire rod 15 secured to the rod 14 and door 1 so that said doors are simultaneously operated by the scale beam.

The coal furnace is adapted for heating water and vaporizing the same into steam which circulates in a heating system throughout dwellings and buildings for heating the same. It is highly desirable to regulate the heat in a simple and direct way. This is accomplished by the aforedescribed automatic regulator which is responsive to the pressure of the steam circulating through the heating system. The said regulator is made responsive through the medium of the diaphragm valve 7 which communicates with the steam through the steam pipe 16 leading from the steam heating system to the lower part of the valve casing, and controlled by a valve operable by the stem 17.

The aforedescribed mechanism operates as follows: The balance weight 11 is adjusted on the scale beam according to the number of pounds of steam desired for heating purposes. This is accomplished by tilting the weight on the shaft 9 to disengage the fin 12$^a$ thereof from the engaged notch 13 in the scale beam and shifting it longitudinally and locking said fin with the notch denoting the required number of pounds pressure. When the steam pressure rises above that selected, the diaphragm valve will be deflected upwardly, thereby tipping the scale beam so as to lower the draft and fuel doors and decrease the combustion of the fuel. And as soon as the steam pressure decreases, the scale beam will gradually return to balance position and gradually open the draft and fuel doors further and increase the combustion. My regulator accordingly automatically varies the draft of the furnace to vary the combustion therein and tends to maintain a constant and predetermined steam pressure.

In Figures 4, 5 and 6, I have shown how my regulator may be adapted for oil furnaces in which the draft door 18 is connected by a wire rod 19 with the forward end of the scale beam 3. The rear end of the scale beam has attached thereto a looped rod 20 through which a rod 21 extends which is provided with adjustable abutments 22 located upon opposite sides of the looped member 20 so that the tilting of the scale beam will bring the same into contact with one of the abutments for shifting the rod 21. The upper end of the rod 21 is provided with a pair of abutments 23 similar to the abutments 22, and a switch lever 24 lies between the abutments 23 and is adapted to be operated thereby. The switch is designed to control a motor 25 which operates an air pump or blower 26 for supplying air to the furnace, and an oil pump 27 for supplying oil to the furnace, the blower being connected with the furnace by the pipe 28 and the oil pump being connected with the furnace by the pipe 29.

This oil furnace is adapted for heating water and vaporizing it into steam as in the case of the coal furnace and the steam communicates with the diaphragm valve 7 that is connected to the scale beam as in the previously described structure. The operation of this modified form is slightly different than when a coal furnace is used, in that the tilting of the scale beam also operates a motor switch to shut down the motor when the steam pressure rises above the predetermined and selected pressure, besides lowering the draft door 18. And when the pressure decreases to that previously selected, the rod 21 will operate the switch to turn on the motor.

In Figures 9 to 14, there is illustrated mechanism responsive to the temperature of the dwelling for automatically starting and stopping the motor 25 used in the oil burning furnace shown in Figure 4. This mechanism comprises a switch in a motor circuit and a thermostat responsive to the temperature of the dwelling and connected between the source of energy and a pair of solenoids that open and close the switch.

The switch comprises a pair of spaced stationary terminals 30 (Fig. 13), each terminal consisting of a pair of posts extending longitudinally through an insulated block 31 supported upon an insulated base 32. Electrical connection between these terminals is established by a longitudinally movable block 33 carrying a transverse conductor in the form of a rod 34, the ends of which are guided in grooves formed between the strips 35 secured to the blocks 31. Contact disks or strips 36 are mounted upon the rod 34 for contact therewith and longitudinal movement thereof, and coil springs 37 confined between the block 33 and said disks serve to press the same against the strips 35 and the ends of the posts 30 for establishing an electrical connection between the two sets of posts 30. When the block 34 is shifted longitudinally, this electrical connection is broken.

The block 33 and the mechanism carried thereby will hereafter broadly be termed the movable contact member of the switch. In order to shift this movable contact member, the same is mounted upon the ends of the cores 38 and 39 of the alined solenoids 40 and 41. For this purpose the solenoid cores are connected together by a rod 42 (Fig. 12) which is threaded into the end of each core, and the block 33 is loosely mounted upon said rod and yieldingly cushioned at each end by a coil spring 43 wound around said rod, the springs being confined between the blocks and the ends of the cores.

The posts 30 are adapted to be connected in series with the motor and source of energy. An auxiliary circuit is adapted to connect the source of energy with the solenoids, and a thermostat is placed in this auxiliary circuit for establishing a circuit through one or the other of said solenoids according to the temperature of the room.

In Fig. 11 are shown a pair of posts 44 to which are connected the conductors 45 (Fig. 10) leading from the thermostat. These posts 44 are adapted to be alternately put in contact with the leaf springs 46 secured upon the posts 47. The posts 47 are connected by link conductors 48 with bolts 49 that extend through the insulated base 32 and to which the terminals 50 of the solenoid coils are connected by conductors 50'. The other terminals of the coils have electrical connections with bolts 51 which extend through the insulated base and are connected at their lower ends by a conductor 52 which is in electrical connection with a return wire 53. A pair of plungers 54 slidingly extend through the base 32 into contact with the leaf spring conductors 46, the upper ends of these plungers being provided with cam-like heads that lie in alinement with the arcuate surface 55 on the bottom of the block 33 to be depressed thereby. When the block 33 is in one extreme position, the adjacent plunger will be depressed to force the leaf spring out of contact with its post 44, and when the block 33 is in the other extreme position, the other plunger will be depressed to force its leaf spring out of contact with its post 44, while the first mentioned leaf spring will have snapped back into contact with its posts.

In Fig. 14 is diagrammatically illustrated the thermostatically controlled system in which E represents the source of electrical energy connected to the motor M by a conductor $a$. A conductor $b$ extends from the motor to a house switch $s$ and a conductor $c$ extends from the house switch to one of the stationary switch terminals 30. The ground conductor $d$ is shown as extending from the source of energy E to the pressure regulator P which may be similar to the one illustrated in Fig. 4. The pressure regulator is in electrical connection with the other switch terminal 30 through a conductor $e$.

The thermostat casing is shown at C in which is positioned a thermostatic element in the form of a wire conductor T with a lower coiled end electrically connected with the source of power through a transformer F. The upper end of the thermostatic element is adapted to be swayed between two contact posts $h$ and $h'$ which are respectively electrically connected with the posts 44 through the conductors 45, and the posts 44 are in electrical connection with the solenoids 40 and 41 through the spring conductors 46, the posts 47 and the conductors 49 and 50'. The return wire for the auxiliary or thermostatic circuit is shown at G, being connected with the source of energy and the different solenoids through the transformer F.

The operation is as follows:

Figs. 9 and 11 illustrate the automatic switch in closed position with the motor in operation providing the house switch S is closed. Consequently fuel will be supplied to the furnace for heating the dwelling. Now if the temperature in the dwelling rises above a predetermined point, the thermostat will expand and the upper end will be swayed into contact with the post $h'$ whereby the circuit through the solenoid 41 will be established for exciting the same. Excitation of the solenoid 41 will draw its core 39 inwardly and simultaneously carry the movable switch member 33 out of contact with the posts 30, whereby the motor circuit is broken for stopping the motor and further supply of fuel to the furnace. When the temperature in the dwelling falls sufficiently, the thermostat T will contract and be swayed over into contact with the post $h$ establishing the circuit through the solenoid 40, which will now become excited and draw in its core and simultaneously carry the movable switch member 33 into contact with the stationary contact members 30 for again establishing the circuit through the motor. As soon as the motor circuit is thuswise established, the plunger 54 will act to break the circuit through the solenoid 40, and the other plunger 54 will be released for establishing the circuit through the other solenoid 41. The shifting of the movable switch member therefore causes the circuit through the actuating solenoid to be automatically broken and establishes the circuit through the other solenoid as is apparent from an inspection of Fig. 11.

It should, however, be understood that the thermostat will not function until the heat in the dwelling reaches a predetermined temperature, and that when the motor is started in the morning, there is a sudden rise in steam pressure that frequently blows out the pop valve before the temperature in the dwelling rises sufficiently to act upon the thermostat, but this blowing off of the pop valve is avoided by the scale beam pressure regulator which operates the switch lever 24 for opening the motor switch and stopping the motor. So there is both a pressure and temperature control in the system.

It will accordingly be apparent that I have devised novel mechanism for automatically controlling the action of a furnace to maintain a predetermined and substantially constant temperature in a dwelling.

I am aware that numerous details of construction may be varied through a wide range without departing from the principles of this invention, and I therefore do not purpose limiting the patent granted otherwise than necessitated by the prior art.

I claim as my invention:

1. In a heating system, a furnace embodying a boiler, mechanism including a motor for feeding fuel thereto, a damper regulator for the furnace responsive to the pressure of the boiler, a switch in the motor circuit controlled by said regulator for stopping and starting said motor, a second switch in the motor circuit, a pair of solenoids for opening and closing said second switch, a thermostat responsive to the delivered heat for alternately connecting said solenoids with a source of energy, and means controlled by said second switch for alternately making and breaking the circuits to said solenoids.

2. In a heating system, a furnace embodying a boiler, mechanism including a motor for feeding fuel thereto, a damper regulator for the furnace responsive to the pressure of the boiler, a switch block also in the motor circuit, a pair of solenoids for actuating said switch block alternately to open and close said motor circuit, separate circuits through said solenoids, a thermostat responsive to the delivered heat for controlling said solenoids, and switches in the solenoid circuits alternately actuated by said switch block to break the circuit to each solenoid after being energized and to reestablish the circuit to the other solenoid.

In testimony whereof I have hereunto subscribed my name in the presence of two subscribing witnesses.

CLYDE SLUSSER.

Witnesses:
SPENCER W. GIBBS,
OSCAR HARTMANN.